(12) United States Patent
Zudrell-Koch et al.

(10) Patent No.: US 8,664,896 B2
(45) Date of Patent: Mar. 4, 2014

(54) ERROR DETECTOR IN AN OPERATING DEVICE FOR LIGHTING DEVICES

(75) Inventors: Stefan Zudrell-Koch, Hohenems (AT); Guenter Marent, Bartholomaeberg (AT)

(73) Assignee: TridonicAtco GmbH & Co. KG, Dornbirn (AT)

( * ) Notice: Subject to any disclaimer, the term of this patent is extended or adjusted under 35 U.S.C. 154(b) by 519 days.

(21) Appl. No.: 12/531,020

(22) PCT Filed: Mar. 12, 2008

(86) PCT No.: PCT/EP2008/001973
§ 371 (c)(1),
(2), (4) Date: Sep. 24, 2009

(87) PCT Pub. No.: WO2008/116561
PCT Pub. Date: Oct. 2, 2008

(65) Prior Publication Data
US 2010/0096994 A1    Apr. 22, 2010

(30) Foreign Application Priority Data
Mar. 28, 2007  (DE) .......................... 10 2007 014 982
Mar. 30, 2007  (DE) .......................... 10 2007 015 508

(51) Int. Cl.
*H05B 37/02* (2006.01)
*G05F 1/00* (2006.01)

(52) U.S. Cl.
USPC ......................................... 315/308; 315/291

(58) Field of Classification Search
USPC ............. 315/119, 291, 307, 246, 224, 200 R, 315/247, DIG. 2, DIG. 4, DIG. 7, 308
See application file for complete search history.

(56) References Cited

U.S. PATENT DOCUMENTS

| | | | |
|---|---|---|---|
| 5,907,223 A | 5/1999 | Gu et al. | |
| 6,011,358 A | 1/2000 | Knobloch et al. | |
| 6,140,771 A * | 10/2000 | Luger et al. | 315/101 |
| 6,400,095 B1 | 6/2002 | Primisser et al. | |
| 6,566,821 B2 * | 5/2003 | Nakatsuka et al. | 315/209 PZ |
| 6,856,519 B2 * | 2/2005 | Lin et al. | 363/16 |
| 6,900,993 B2 * | 5/2005 | Lin et al. | 363/17 |
| 6,906,500 B2 * | 6/2005 | Kernahan | 323/225 |
| 6,956,336 B2 * | 10/2005 | Ribarich | 315/247 |
| 7,327,101 B1 * | 2/2008 | Chen et al. | 315/307 |
| 7,560,873 B2 * | 7/2009 | Feldtkeller et al. | 315/224 |
| 7,812,612 B2 * | 10/2010 | Feldtkeller et al. | 324/414 |
| 2004/0085783 A1 * | 5/2004 | Lin et al. | 363/21.01 |

FOREIGN PATENT DOCUMENTS

| | | |
|---|---|---|
| EP | 0871348 A1 | 10/1998 |
| WO | WO-9528819 A1 | 10/1995 |
| WO | WO-9934647 A1 | 7/1999 |

OTHER PUBLICATIONS

International Search Report for PCT/EP2008/001973 dated May 28, 2008.

* cited by examiner

*Primary Examiner* — Minh D A
(74) *Attorney, Agent, or Firm* — Marshall, Gerstein & Borun LLP

(57) ABSTRACT

A control circuit for an operating device for lighting devices, wherein a return signal is supplied to an input of the control circuit by the lighting device, and the control circuit has an error detection block that recognizes at least two different types of lighting device errors by means of the return signal applied at said input.

30 Claims, 3 Drawing Sheets

ERROR DETECTOR IN AN OPERATING DEVICE FOR LIGHTING DEVICES

BACKGROUND OF THE INVENTION

Field of the Invention

The present invention relates generally to the field of operating devices for lighting means. Typical examples are electronic ballasts for operating gas-discharge lamps, high pressure lamps, light-emitting diodes, etc. It is generally the task of these operating devices to supply the associated lighting means with a supply voltage having an adapted voltage and/or frequency.

Related technology

The invention relates in particular to operating devices having control units, to which measuring signals, which for example differ in dependence upon the configuration of the operating device, can be supplied for the purpose of detecting an error status of the lighting means.

As will be explained hereinafter using the "discharge lamp" example of lighting means, there are errors statuses which are expressed in distinguishable measuring signals:

At the end of the service life of a gas-discharge lamp, a rectifier effect is often produced, i.e., the progression of the lamp voltage is no longer symmetrical about the zero line, but is rather offset with respect thereto.

As is also the case with other lamps, in gas-discharge lamps signs of wear on the heating spirals at the end of the service life of the gas-discharge lamp produce the effect that the lamp electrodes become unevenly worn over time, i.e., the wear of the emitting layers on the lamp electrodes is different.

This different wear on the lamp electrodes produces differences in the emittance of the two lamp electrodes.

This different emittance leads to the situation where in the corresponding gas-discharge lamp a higher current flows from one lamp electrode to the other lamp electrode than vice-versa which means that the temporal progression of the lamp current is superelevated during a half-wave. The different wear on the two lamp electrodes thus produces asymmetries which not only cause a greater amount of light flickering at the end of the service life of the gas-discharge lamp, but actually, in extreme cases, only allow operation of the gas-discharge lamp during a half-wave, i.e., during the superelevated half-wave. The gas-discharge lamp acts quasi like a rectifier which means that the above described effect is referred to as the "rectifier effect".

On a lamp electrode which has a greater amount of wear over time, the work function for the electrons is higher than on the electrode with a lesser amount of wear.

The work function is generally referred to as the minimum amount of energy required to extract an electron from a metal, in this case from the lamp electrode. The dipole layer on the surface of the metal, i.e., the lamp electrode, is thus an important factor for determining the work function.

The lamp electrode which has a greater amount of wear and has a higher work function for the electrons is consequently heated to a greater extent when the gas-discharge lamp is put into operation than the electrode with a lesser amount of wear. The lamp electrode can become heated to such a great extent, in particular in lamps having a small diameter, that even parts of the lamp bulb may melt. In order to obviate the risk of accidents, which arises as a result of the heating of the lamp bulb, during operation of the gas-discharge lamp, the rectifier effect must consequently be recognized and possibly the gas-discharge lamp must be switched off or its power input must be reduced.

However, a distinction should be made between a slowly produced rectifier effect at the end of the service life of a lamp and a rectifier effect which is produced very quickly in relation thereto, which is also referred to as a "hard rectifier effect". This hard rectifier effect must be recognized and countermeasures must be instantaneously taken since during the course of this hard rectifier effect, extremely high voltages can be produced on the lamp. In any case, there is the requirement for a ballast to provide countermeasures for the slow rectifier effect and also for the quickly occurring rectifier effect.

The provisions in relation to the slow rectifier effect are directed towards the lamp output, i.e., in the case of a slow rectifier effect occurring, the lamp output may only differ from the desired output in percentages in a particular range.

In contrast, in the case of a fast rectifier effect, it is the voltage peak which must not exceed a prescribed desired value.

This recognition is particularly important of course when applying the starting voltage which is substantially higher than the burning voltage of the lamp.

The hard or slow rectifier effects are only examples of how different errors have to be recognized in an operating device for lighting means in order to take suitable countermeasures as required.

WO9934647 has previously disclosed the recognition of the rectifier effect occurring in a gas-discharge lamp. To recognize the rectifier effect, the lamp voltage applied at a gas-discharge lamp to be monitored or a parameter dependent thereon is detected and integrated, wherein the presence of a rectifier effect is suggested if the integration result deviates from a particular desired value.

SUMMARY OF THE INVENTION

The invention provides a technique that allows different types of errors to be distinguished using a feedback signal from the lighting means (or using the load circuit comprising the lighting means).

Accordingly, the invention provides a control circuit for an operating device for lighting means, wherein a feedback signal from the lighting means is supplied to an input of the control circuit and the control circuit comprises an error recognition block that recognizes at least two different types of lighting means errors using the feedback signal applied at this input.

The invention also provides an operating device for lighting means, preferably an electronic ballast for gas-discharge lamps, comprising the inventive control circuit.

Further, the invention provides a light, comprising a lighting means and an inventive operating device.

Still further, the invention provides a method for recognizing types of error in a control circuit for an operating device for lighting means, as well as a computer software program product that implements the method when the computer software program product is running in a computing device. The invention also provides an integrated circuit, in particular an ASIC, or a microcontroller or a hybrid version thereof designed to implement the inventive method.

In accordance with a first aspect of the invention, a control circuit for an operating device for lighting means is provided. A feedback signal from the lighting means is supplied to an input of the control circuit. The control circuit comprises an error recognition block which recognizes at least two different types of lighting means errors using the feedback signal applied at this input.

The error recognition block can evaluate the feedback signal using at least two different criteria.

The feedback signal can be supplied to a comparator in the control circuit in order for it to be compared with a reference value. The error recognition block can evaluate the duty cycle of the comparator using at least two different criteria.

The criteria can be at least one of:
duration of the deviation of the duty cycle from a desired value, in particular 50%, and
amount of the deviation of the duty cycle from a desired value, in particular 50%.

The criterion "duration of the deviation" can be implemented in the error recognition block by means of low-pass filtering or integration of the signal reproducing the duty cycle.

The criterion "amount of the deviation" can be implemented in the error recognition block by means of the signal reproducing the duty cycle, by means of a threshold value comparison.

The error recognition block can use the two following criteria:
a small deviation of the duty cycle from a desired value, in particular 50%, over a relatively long period of time is recognized as an error, and
a comparatively large deviation of the duty cycle from a desired value, in particular 50%, in a comparatively short period of time is recognized as an error.

The feedback signal can be the lamp voltage or a parameter dependent thereon.

The lighting means can be in particular a discharge lamp.

The control circuit can control, by means of an output signal, an inverter to which a load circuit containing the lamp is connected.

The control circuit can be designed to output a signal which switches off the inverter if at least one type of error is recognized.

The invention also relates to a method for recognizing types of error in a control circuit for an operating device for lighting means,
wherein at least two different types of lighting means errors are recognized using a parameter of the lighting means detected by means of a feedback signal from the lighting means, wherein the different error types are recognized in that the feedback signal is evaluated using at least two different criteria.

BRIEF DESCRIPTION OF THE DRAWINGS

Further advantages, features and characteristics of the invention will now be explained with reference to the Figures of the attached drawings, in which.

DETAILED DESCRIPTION

The invention will now be explained with reference to the circuit of FIG. 1.

Figure 1:
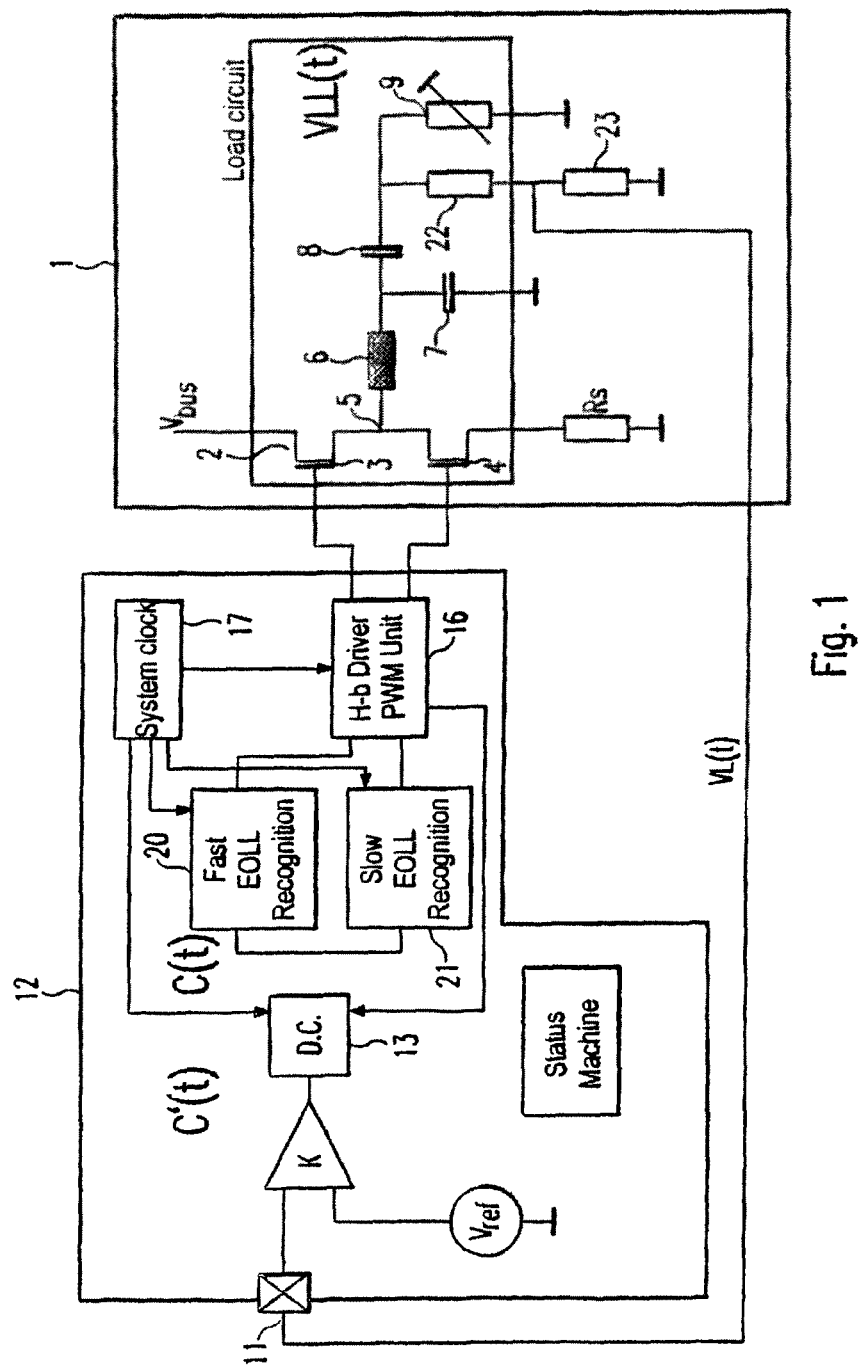
FIG. 1 shows a schematic view of a digital integrated control circuit (controller) to which a load circuit which contains lighting means is connected.

In FIG. 1, a load circuit is schematically referenced with the reference numeral 1. A substantially constant intermediate circuit voltage (bus voltage) $V_{bus}$ (optionally set to a desired value) is supplied to this load circuit 1, wherein this bus voltage is a DC voltage. To be more precise, this bus voltage is supplied to a half-bridge circuit which is schematically referenced with the reference numeral 2 and comprises two alternately pulsed switches 3, 4. These switches 3, 4 are preferably MOSFETs.

The actual load circuit is coupled to the centre point 5 of the half-bridge circuit 2, wherein the load circuit comprises a series resonance circuit consisting of an inductor 6 and a capacitor 7 as well as a coupling capacitor 8.

Lighting means 9 are connected in parallel with the resonance capacitor 7 and can be, for example, a gas-discharge lamp, one or several high pressure lamps or light-emitting diodes. As illustrated schematically in FIG. 1, these lighting means can comprise in particular a frequency-dependent characteristic curve. The frequency of the supply voltage for the lighting means 9, which produces the half-bridge circuit based on the DC bus voltage, can thus be used to modulate the output of the lighting means 9.

The output can also be controlled by modulating the duty cycle (PWM modulation).

FIG. 1 shows that the lamp voltage VL(t) is tapped via a voltage divider 22, 23 in parallel with the lamp 9 schematically illustrated as a variable resistor and is supplied back to a pin 11 of the integrated circuit 12.

The inverter current can be detected and supplied back to the control unit 12 via a measuring resistor Rs in series with the lower-potential switch 4 of the inverter 2.

Alternatively or in addition, the lamp current can also be detected itself and supplied back to the control unit 12.

Alternatively or in addition, the lamp current can also be detected itself and [lacuna] to the control unit 12.

Finally, parameters from an intermediate circuit (not illustrated) can also be supplied back to the control unit 12, which intermediate circuit can comprise an active PFC and provides the voltage VBUS. The control unit 12 can also control other active components of the intermediate circuit, in particular a switch of the active PFC in order to regulate the intermediate circuit (digitally).

The control circuit should now be in a position to know how to recognize different types of errors of the lighting means 9 using the feedback signal VL(t). This feedback signal can also be for example a parameter dependent upon the lamp voltage.

In particular, the control circuit can be formed so as to recognize two different effects in the feedback signal:
when the peak value of the lamp voltage has been exceeded for a short period of time in the event of a fast rectifier effect, and
when there is a slight deviation from the symmetrical lamp voltage progression over a longer period of time in the event of a slow rectifier effect.

In order to distinguish between the two events described above, the feedback signal supplied to the pin 11 is supplied to a comparator K in the control circuit, which comparator compares the feedback signal with a reference voltage Vref. The result of the comparison is supplied to a duty cycle evaluation unit 13 which is pulsed by the system clock 17. The duty cycle can be determined for example in that a digital counter is provided in the unit 13, which counter counts downwards when the comparator has an output of logic 0 and counts upwards when the comparator has an output of logic 1. At the end of a control period of the inverter 2, the deviation of the counter reading from its original reading represents a measurement for the deviation of the duty cycle from 50%. As illustrated schematically in FIG. 1, the counter is reset (initialized) after every inverter period.

The duty cycle deviation value of the previous inverter period is then supplied to at least two parallel logic evaluation branches which are formed in each case to switch off the lamp if a slow rectifier effect is recognized (slow EOLL recognition) or if a fast rectifier effect is recognized (fast EOLL recognition). "EOLL" stands for "End of Lamp Life".

When one of the two types of errors is recognized, comparable or even different countermeasures can be taken. One countermeasure can be in particular the modification of the control of the lighting means (error operation mode). In the illustrated example, in the event of an error being recognized, the inverter (half-bridge) driver 16 is controlled so that it operates the inverter 2 in an error mode which consists for example of switching off the inverter and thus the lamp.

In order to detect the slow rectifier effect, a small deviation of a signal which is temporally significantly filtered is evaluated, whilst in the case of the branch for detecting the fast rectifier effect a comparatively large deviation but which occurs over a short period of time and thus appears as an unfiltered signal is detected.

Owing to these different time constants, the detection of the slow rectifier effect is preferably performed by a microcontroller, whilst the time-critical detection of the fast rectifier effect is preferably implemented by hardware logic (e.g., ASIC).

In order to detect the slow rectifier effect, the duty cycle of the output signal of the comparator is low-pass filtered (corresponds to an integration) so that only long-term deviations accumulate to a value above a predetermined threshold value and can thus trigger an error switch-off procedure (or another error countermeasure).

Whilst the switch-off time constant for the slow rectifier effect are in the range of milliseconds for example (i.e., the deviation has to be in the symmetry of the lamp voltage signal for this length of time in order to result in a switch-off procedure), the corresponding time constant in the case of the block for recognizing the fast rectifier effect is in the range of several 100 µs.

As described above, the threshold values defining one corridor for the permissible deviation of the low-pass filtered signal are set to be comparatively narrow for recognizing the slow rectifier effect.

In contrast, the permissible deviations of the duty cycle are set to be comparatively wide for detecting the fast rectifier effect since comparatively large peak value deviations which occur within a short period of time are to be detected.

In general, provision is made in accordance with the invention that using the duty cycle of the lamp voltage signal different types of errors of the lamp can be recognized, in that the duty cycle is subjected to different evaluation criteria. The different error events can thus be differentiated by different temporal discrimination as well as different threshold value parameters for the counter reading.

In the invention, for the purpose of the error switch-off procedure a single signal can generally be evaluated as to whether a large deviation occurs within a short period of time and/or a small deviation occurs over a long period of time.

However, provision can also be made that instead of a single comparator K being provided, the feedback signal is compared with different reference signals by several comparators.

Figure 2:
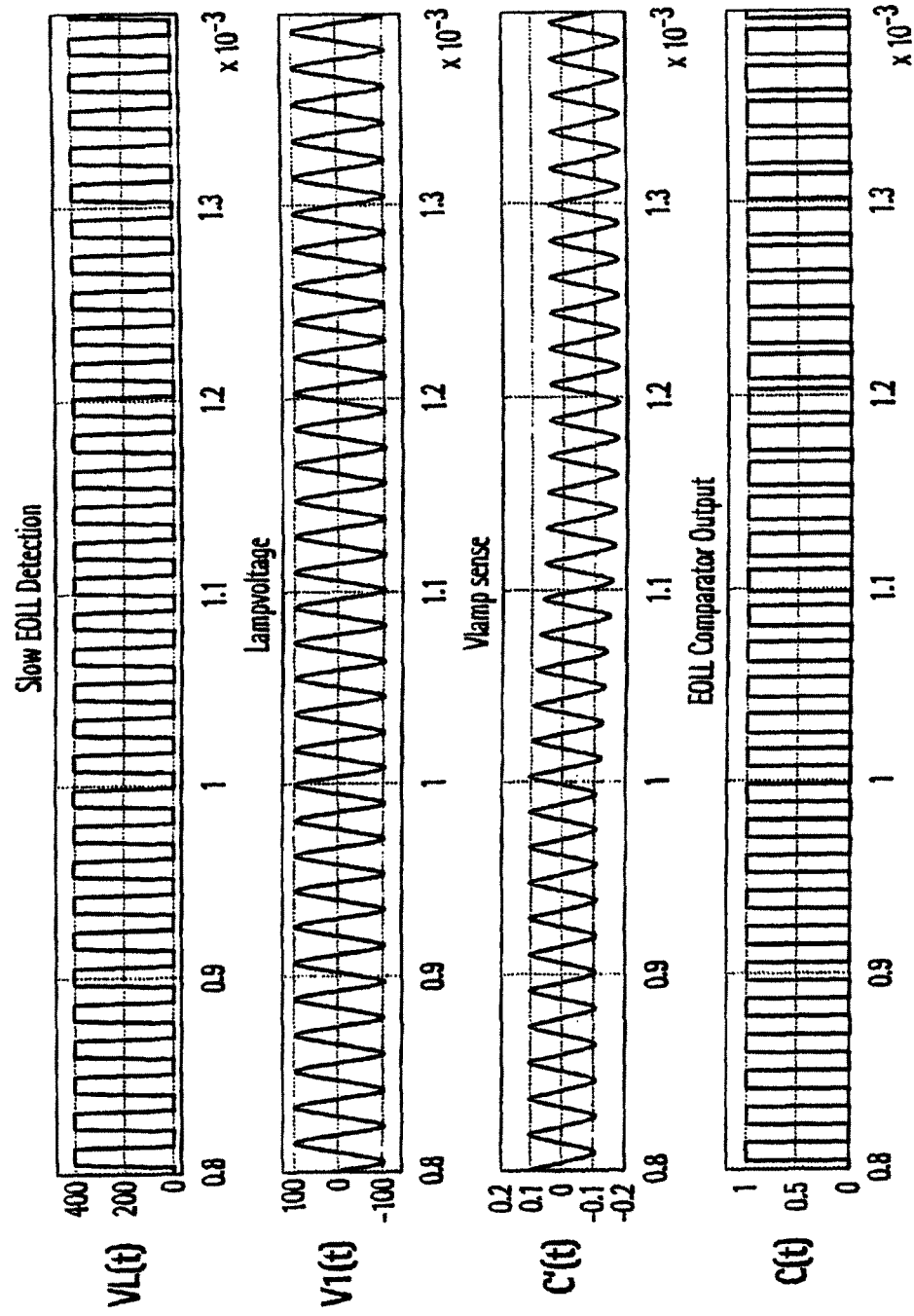
FIG. 2 shows the signal progression in the event of a slow rectifier effect.

FIG. 2 shows how the signals are produced and processed in the event of a so-called slow rectifier effect in the circuit of FIG. 1. The lamp voltage VLL(t) is tapped via a voltage divider 22, 23 in parallel with the lamp 9 schematically illustrated as a variable resistor and is supplied back to a pin 11 of the integrated circuit 12. Whilst the lamp voltage VLL(t) has a level of 400 V for example, the monitored signal V1(t) is decreased by the voltage divider 22, 23 in a ratio of for example about 400:1, so that the signal can be detected by the control logic 12 at a level enabling the control logic to process the signal. In order to distinguish between the two events described above, the feedback signal supplied to the pin 11 is supplied to a comparator K in the control circuit, which comparator compares the feedback signal with a reference voltage Vref and generates an output signal C'(t).

In order to detect the slow rectifier effect, the duty cycle of the output signal C'(t) of the comparator is therefore low-pass filtered (corresponds to an integration) so that only long-term deviations accumulate to a value above a predetermined threshold value and can thus trigger an error switch-off procedure (or another error countermeasure).

Figure 3:
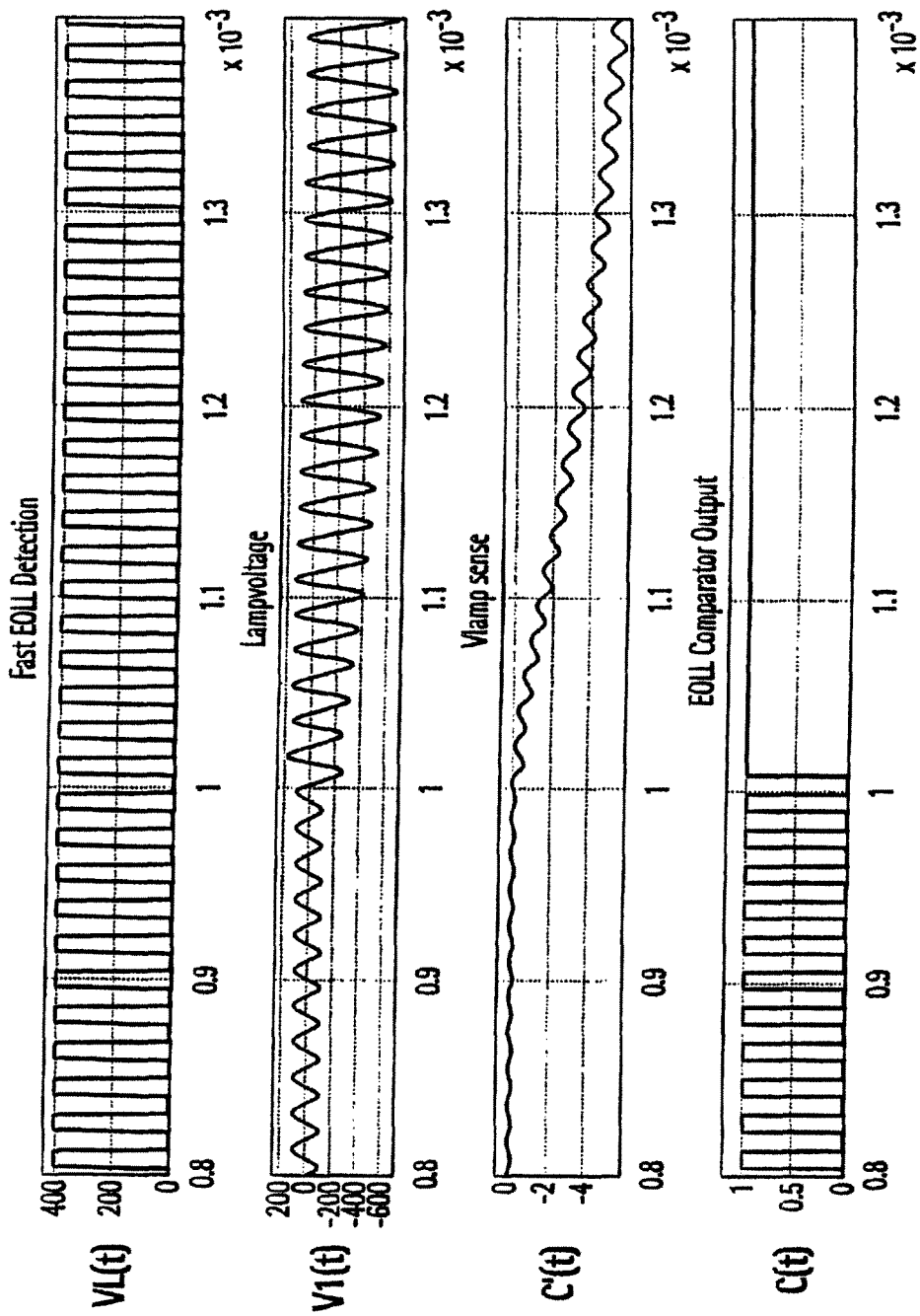
FIG. 3 shows the signal progression in the event of a fast rectifier effect.

FIG. 3 shows how, in the case of a fast rectifier effect owing to the large peak value deviation, a long-lasting deviation is signaled and supplied to the evaluation unit 13.

The invention claimed is:

1. A control circuit for an operating device for lighting means, wherein a feedback signal from the lighting means is supplied to an input of the control circuit and the control circuit comprises an error recognition block which recognizes at least two different types of lighting means errors using the feedback signal applied at the input, wherein the feedback signal is a voltage of the lighting means and the error recognition block evaluates the feedback signal using at least two different criteria.

2. The control circuit as claimed in claim 1, wherein the feedback signal is supplied to a comparator in the control circuit for it to be compared with a reference value, and the error recognition block evaluates the duty cycle of the comparator using at least two different criteria.

3. The control circuit as claimed in claim 2, wherein the criteria are at least one criterion selected from the group consisting of a duration of the deviation of the duty cycle from a desired value, and an amount of the deviation of the duty cycle from a desired value.

4. The control circuit as claimed in claim 3, wherein the criterion duration of the deviation is implemented in the error recognition block by low-pass filtering or integration of a signal reproducing the duty cycle.

5. The control circuit as claimed in claim 3, wherein the criterion amount of the deviation is implemented in the error recognition block by a signal reproducing the duty cycle, by a threshold value comparison.

6. The control circuit as claimed in claim 2, wherein the error recognition block uses the two following criteria: a small deviation of the duty cycle from a desired value over a relatively long period of time, and a comparatively large deviation of the duty cycle from a desired value in a comparatively short period of time.

7. The control circuit as claimed in claim 2, wherein the criteria are at least one of the group consisting of: a duration of the deviation of the duty cycle from a desired value of 50%, and an amount of the deviation of the duty cycle from a desired value of 50%.

8. The control circuit as claimed in claim 2, wherein the error recognition block uses the two following criteria: a small deviation of the duty cycle from a desired value of 50% over a relatively long period of time, and a comparatively large deviation of the duty cycle from a desired value of 50% in a comparatively short period of time.

9. The control circuit as claimed in claim 1, wherein the lighting means is a discharge lamp.

10. The control circuit as claimed in claim 1, which controls, by an output signal, an inverter to which a load circuit containing the lighting means is connected.

11. The control circuit as claimed in claim 10, wherein the control circuit is designed to output a signal which switches off the inverter if at least one type of error is recognized.

12. An operating device for lighting means comprising the control circuit as claimed in claim 1.

13. A light comprising a lighting means and the operating device as claimed in claim 12.

14. An operating device for an electronic ballast for gas-discharge lamps comprising the control circuit as claimed in claim 1.

15. A method for recognizing types of error in a control circuit for an operating device for lighting means, the method comprising:
recognizing at least two different types of lighting means errors using a feedback signal from the lighting means supplied to an input of the control circuit, wherein the feedback signal is a voltage of the lighting means, supplying the feedback signal to a comparator in the control circuit for the feedback signal to be compared to a reference value, and evaluating a duty cycle of the comparator using at least two different criteria.

16. The method as claimed in claim 15, wherein the criteria are at least one criterion selected from the group consisting of a duration of the deviation of the duty cycle from a desired value, and an amount of the deviation of the duty cycle from a desired value.

17. The method as claimed in claim 15, comprising implementing the criterion duration of the deviation in the error recognition block by low-pass filtering or integration of a signal reproducing the duty cycle.

18. The method as claimed in claim 15, comprising implementing the criterion amount of the deviation in the error recognition block by the signal reproducing the duty cycle by a threshold value comparison.

19. The method as claimed in claim 15, comprising using the two following criteria: a small deviation of the duty cycle from a desired value over a relatively long period of time, and a comparatively large deviation of the duty cycle from a desired value in a comparatively short period of time.

20. The method as claimed in claim 15, comprising controlling, by an output signal, an inverter to which a load circuit containing the lighting means is connected.

21. The method as claimed in claim 20, comprising switching off the inverter if at least one type of error is recognized.

22. A non-transitory computer software program product, which implements the method as claimed in claim 15 when the computer software program product is running in a computing device.

23. An integrated circuit or microcontroller or a hybrid version thereof designed to implement the method as claimed in claim 15.

24. The method as claimed in claim 15, wherein the criteria are at least one criterion selected from the group consisting of: a duration of the deviation of the duty cycle from a desired value of 50%, and an amount of the deviation of the duty cycle from a desired value of 50%.

25. The method as claimed in claim 15, comprising using the two following criteria: a small deviation of the duty cycle from a desired value of 50% over a relatively long period of time, and a comparatively large deviation of the duty cycle from a desired value of 50% in a comparatively short period of time.

26. An ASIC integrated circuit designed to implement the method as claimed in claim 15.

27. A control circuit for an operating device for lighting means, wherein a feedback signal from the lighting means is supplied to an input of the control circuit and the control circuit comprises an error recognition block which recognizes at least two different types of lighting means errors using the feedback signal applied at the input, wherein the feedback signal is a parameter dependent on a voltage of the lighting means and the error recognition block evaluates the feedback signal using at least two different criteria.

28. A control circuit for an operating device for lighting means, wherein a feedback signal from the lighting means is supplied to an input of the control circuit and the control circuit comprises an error recognition block which recognizes at least two different types of lighting means errors using the feedback signal applied at the input, wherein the feedback signal is obtained by tapping a voltage of the lighting means and the error recognition block evaluates the feedback signal using at least two different criteria.

29. A method for recognizing types of error in a control circuit for an operating device for lighting means, the method comprising:
recognizing at least two different types of lighting means errors using a feedback signal from the lighting means supplied to an input of the control circuit, wherein the feedback signal is a parameter dependent on a voltage of the lighting means and evaluating the feedback signal using at least two different criteria.

30. A method for recognizing types of error in a control circuit for an operating device for lighting means, the method comprising:
recognizing at least two different types of lighting means errors using a feedback signal from the lighting means supplied to an input of the control circuit, wherein the feedback signal is obtained by tapping a voltage of the lighting means and evaluating the feedback signal using at least two different criteria.

* * * * *